United States Patent
Tod, Jr.

(10) Patent No.: US 6,209,706 B1
(45) Date of Patent: Apr. 3, 2001

(54) ARTICLE GROUPING AND TRANSFERRING SYSTEM

(76) Inventor: G. Robert Tod, Jr., 100 Industrial Way, Portland, ME (US) 04103

( * ) Notice: Subject to any disclaimer, the term of this patent is extended or adjusted under 35 U.S.C. 154(b) by 0 days.

(21) Appl. No.: 09/258,748

(22) Filed: Feb. 26, 1999

(51) Int. Cl.[7] .................................................. B65G 47/26
(52) U.S. Cl. ......................... 198/418; 198/426; 198/430; 198/598
(58) Field of Search .................................. 198/418, 426, 198/430, 431, 432, 598

(56) References Cited

U.S. PATENT DOCUMENTS

| | | |
|---|---|---|
| 3,190,434 | 6/1965 | Dardaine . |
| 3,680,678 | 8/1972 | Gsnx . |
| 3,777,886 * | 12/1973 | Smith et al. ........................... 209/552 |
| 4,174,777 * | 11/1979 | Riehle ............................. 198/781.06 |
| 4,289,080 * | 9/1981 | Penley ................................... 111/105 |
| 4,325,476 * | 4/1982 | Eddy ..................................... 198/448 |
| 4,446,960 * | 5/1984 | Zauner et al. ........................ 198/408 |
| 5,133,446 | 7/1992 | Draghetti . |
| 5,310,300 * | 5/1994 | Crabb et al. ........................... 414/280 |
| 5,528,878 * | 6/1996 | Edwards et al. ......................... 53/54 |
| 5,579,893 | 12/1996 | Mokler . |
| 5,701,726 * | 12/1997 | Smith ..................................... 53/544 |

* cited by examiner

*Primary Examiner*—Christopher P. Ellis
*Assistant Examiner*—Kenneth W Bower
(74) *Attorney, Agent, or Firm*—Thomas L. Bohan; Patricia M. Mathers

(57) ABSTRACT

System for grouping and transferring articles from an upstream station to a downstream station. Articles are pushed onto a transfer station table and transferred as a row of articles to a downstream conveyor extending at right angles to the direction of the upstream conveyor. The transfer cycle is initiated by an article deflecting a whip switch, which actuates a pilot actuator. The pilot actuator sends air to a lifting ram, thus causing a rocker arm with a tooth to disengage from a timing wheel; the disengaged rocker arm opens an air valve, pressurizing a master cylinder. The master cylinder forces a ratchet arm to rotate a shaft having push-rod assemblies mounted on it. As the shaft rotates, push-rods jut up through slots in the transfer station table and push the row of articles onto a staging area, as new articles continue to move onto the transfer station. Flow of air to the lifting ram is interrupted as the article loses contact with the ship switch. This allows the tooth end of the rocker arm to swing upward and to ride along the circumferential edge of the timing wheel until the tooth engages the next slot presented by the rotating timing wheel. Engagement of the tooth in the timing wheel lifts the rocker arm off the air valve, allowing the master cylinder air valve to close. The master cylinder is no longer pressurized, the ratchet arm retracts into the cylinder, and the shaft is locked into position after a ¼-turn.

20 Claims, 5 Drawing Sheets

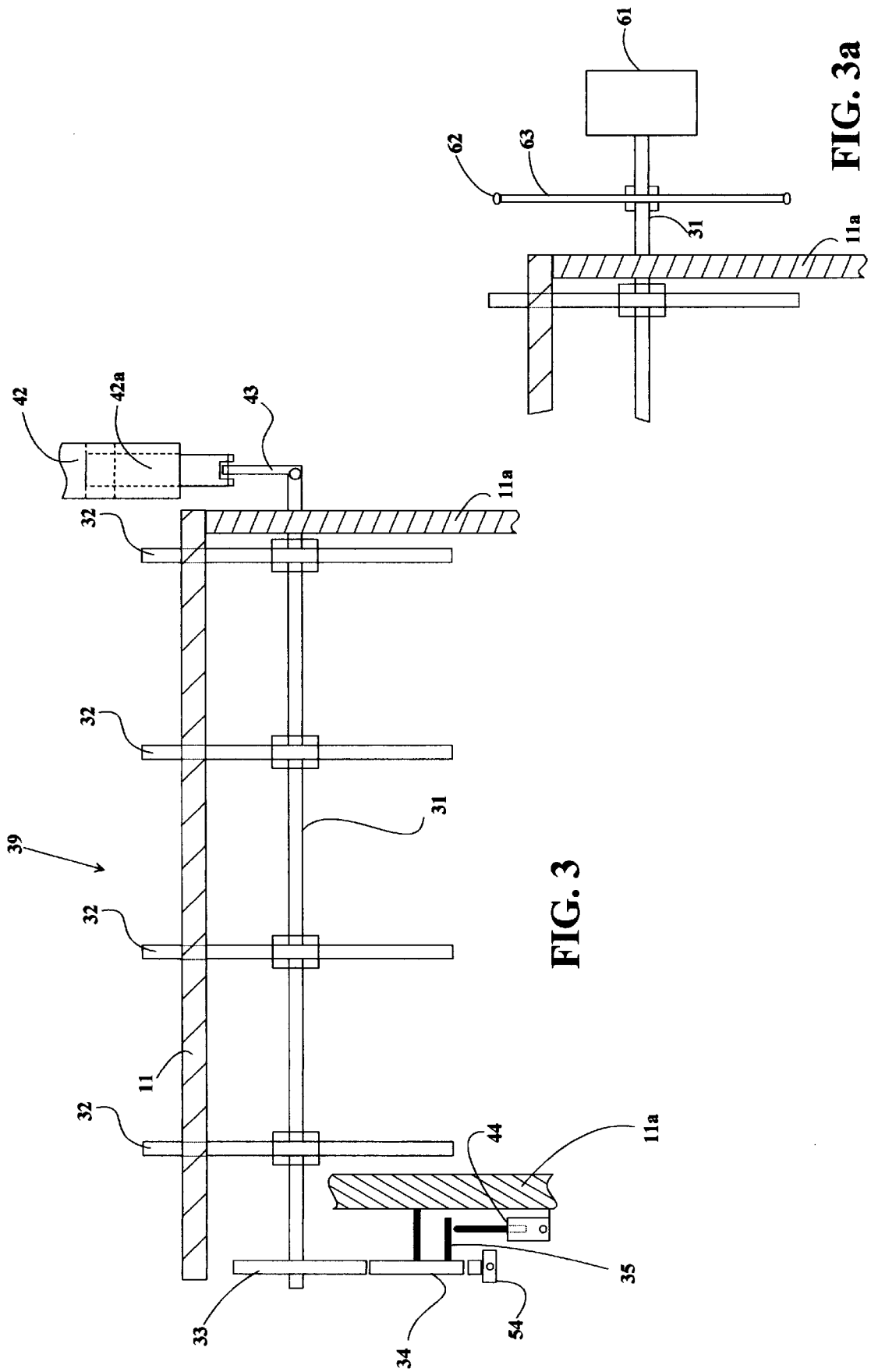

ARTICLE GROUPING AND TRANSFERRING SYSTEM

BACKGROUND OF THE INVENTION

1. Field of the Invention

The present invention relates to a device for the formation and transfer of groups of articles. In particular, the present invention relates to a device for the formation of a group of articles on a conveyor and the transfer of the group from one processing operation to another. More particularly, the present invention relates to a device for transferring groups of articles at right angles to the initial feed direction. More particularly yet, the present invention relates to a device that uses pneumatic controls to group the bottles and transfer them to a filling operation.

2. Description of Prior Art

Conveyors are commonly used in manufacturing and food processing operations to move articles or goods from one operation to another. For many types of operations it is advantageous to have the articles grouped for batch processing. Such typical batch-processing operations include applying labels to bottles or cans or other types of containers, packing bottles, cans or boxes into crates, or filling containers with liquid or semi-liquid material. A number of devices or systems are known that group articles for batch processing. Many of the systems known in the prior art use a system of endless chains that run alongside one side or both sides of the conveyor transporting the articles to be processed. Typically, these chains run at a slower speed than the conveyor and have lugs, pins, or rods arranged on them at predetermined distances that are moved into the path of the conveyor and inserted between the articles on the conveyor as a means of breaking a continuous flow articles into groups of articles. The device disclosed by Dardaine (U.S. Pat. No. 3,190,434;1962) is illustrative of many of the devices that use an endless chain running parallel to the conveyor. Stop members or pins are mounted on the endless chain at intervals that correspond to the distance of six bottles. The endless chain runs at a slower speed than the belt. As the chain is driven around a sprocket, a first stop member is moved into the path of the bottles on the belt and inserted between two bottles. This slows the bottles on the upstream side of the stop member while allowing the bottles downstream of the stop member to proceed at the speed of the belt. As the chain travels parallel to the belt, the first stop member will pull away from the path of the belt downstream from its initial insertion point as a second stop member is moving into the path, slowing down the travel speed of the next batch of bottles and thus, creating a space between the first group and the second group of articles.

The devices of the above mentioned type have several disadvantages: they are cumbersome and require a certain amount of space to each side of the conveyor belt; they are material-intensive and thus, expensive; they are also power-intensive because they run continuously; and they are loud. Furthermore, these devices do not change the configuration of the number of articles abreast, i.e., they do not convert a single or double file feed of articles to multiple articles abreast, but merely create a distance between one group of rows of articles and a following group. Ganz (U.S. Pat. No. 3,680,678; 1972) does teach the formation of a group of several articles abreast, converted from a single-file feed of articles. The method and apparatus that Ganz uses to form multiple articles abreast, however, requires a substantial amount of linear space because single-feed articles must first run through a restricted section of the belt to force them into a nesting formation, and then through a section providing the full width required by the cluster for proper spacing. Furthermore, none of these devices manipulates the articles so as to move them onto a second conveyor or processing line that is situated at right angles. Space requirements often do not allow for a long processing run in one direction; utilization of space is sometimes more efficient if articles can be manipulated to move to the left or right of the feed conveyor.

A number of devices that group articles on a conveyor belt use overhead grippers to transfer the grouped articles to a second conveyor or another station. Mokler (U.S. Pat. No. 5,579,893; 1996) teaches the use of two conveyors at right angles to each other to receive articles from a single file feed conveyor and to pass them on at right angles in rows of several articles abreast. The transfer mechanism used to move the articles from the first conveyor to the second one is an overhead gripper that uses suction force to lift the articles and a release of the force to drop the articles onto the second conveyor. The configuration of the suction gripper determines how many rows are transferred in a single operation. A disadvantage of this method of transferring articles from one conveyor to another is that the suction gripper is a complex device that is not well-suited for gripping tall, narrow objects such as bottles.

Draghetti (U.S. Pat. No. 5,133,446) teaches the use of a pusher that moves a single file group of articles into a receiving bay on a table at right angles to the direction of the single file feed line. A conveyor belt having slats mounted on it runs in an endless loop above the table, the slats on the lower part of the loop forming a receiving bay adjacent to the single-file feed line. The bay moves with the belt in a direction parallel to the single-file feed line and drags the articles in the receiving bay along a table surface and onto a second feed line that is situated at right angles to the direction of the single file feed line. The Draghetti device is designed to group articles in a predetermined configuration of rows and columns for an operation that treats the presented group as a single unit, such as a wrapping operation; the device does not present a continuous feed of rows of articles in an operation that processes the individual articles, such as a filling or labeling operation. It is also designed to transfer objects that are not very tall and that have regular dimensions, such as straight-sided cylinders or substantially rectangular containers. The Draghetti device is not suited to transfer tall narrow objects, such as beer bottles, because the receiving bay slats would have to be correspondingly long and that would make it difficult to drag the bottles along the surface, as the slats are mounted on a belt and not on a rigid structure that would provide the rigidity and force required to move such articles.

Conveyors and batch-processing are often used in operations in which bottles or cans or jars are filled with a liquid or semiliquid material. In such operations spillage is always a possibility. For this reason, having a system that is safe to use in a wet environment is advantageous. All of the grouping systems described above rely on electrical means to control and drive the devices. Such systems may represent a hazard in filling operations where spillage can occur.

Therefore, what is needed is an inexpensive yet rugged device for grouping articles What is further needed is such a device that will group articles in rows and continuously feed the rows at a 90° angle to the next processing operation. What is yet further needed is a device that is safe to operate in a wet environment and easy to maintain. What is still further needed is a device that does not significantly increase the space requirements beyond the requirements for the conveyor system.

BRIEF SUMMARY OF THE INVENTION

It is an object of the present invention to provide an inexpensive and rugged device that will group articles fed from a single-file or multiple-file feed line into rows and provide a downstream operation with a continuous feed of rows of articles. It is a further object of the present invention to provide such a device that will feed rows of articles to a downstream operation at right angles to the direction of the initial feed line. It is a yet further object of the present invention to provide such a device that requires a minimum of maintenance, is safe to operate in a wet environment, and does not significantly expand the footprint of the existing conveyor system.

The device of the present invention provides a novel means for grouping single file articles into rows and providing a continuous feed of rows of such articles to a downstream processing operation. The device of the present invention also provides a means of controlling the flow of articles through the conveyor system. The heart of the system is a transfer station driven by a pneumatically controlled shaft. The shaft is mounted beneath the transfer station and does not significantly expand the floor space requirements beyond the footprint of the conveyor system. Pushers are mounted on the shaft and, as the shaft rotates, these pushers reach up through slots in the transfer station table and push the articles stationed there at right angles to the initial feed direction onto the next conveyor. The system is inexpensive to construct, safe in its operation, and requires minimal maintenance.

The grouping and transfer device of the present invention is installed at the end of a continuous feed conveyor to receive articles that are to be sent as a group to another processing station, such as a Meheen Manufacturing brand filling station often used in micro-breweries and other small to medium-size bottling facilities. In the Preferred Embodiment, the continuous feed conveyor feeds bottles single file, in an upright position, but the device of the present invention is not limited to this configuration. Indeed, the types of articles that can be grouped and transferred using the device of the present invention are numerous and include cans, boxes, jars, i.e., any article that has sufficient rigidity to be pushed. Furthermore, the articles can be fed single file or multiple file, as long as the number of articles being fed at one time is consistently the same. The articles are fed by a continuous-feed conveyor onto a transfer station table across which the articles are slidably moved along in a guide groove formed or cut into the table surface by force of upstream articles until the lead article deflects a whip switch and eventually is pushed up against a guide rail at the far end of the transfer station table. Since the articles are guided in a groove and are moved by the force applied from upstream articles, each article on the transfer station table is in direct contact with the adjacent article on the table and the articles are, per force, properly aligned in a row.

The transfer station table has slots in it. A pneumatically-controlled shaft with four push-rod assemblies is mounted beneath the transfer station table. As the lead bottle approaches the guide rail, it pushes against and deflects a whisker on a whip switch. Air rushing through the whip switch causes the pressure to drop in the three-way pilot actuator and opens a valve that allows air to flow to a lifting ram. The lifting ram lifts one end of a rocker arm, thereby pivoting the other end of the rocker arm downward and disengaging a tooth from a timing wheel mounted on one end of the shaft. In this position, the rocker arm opens a master cylinder valve that sends air to a master cylinder. The shaft with the push-rod assemblies mounted on it is now free to rotate under a force applied by the ratchet arm attached to the other end of the shaft. The push-rod assemblies rotate with the shaft and jut up through the slots in the transfer table as they pass through the arc of rotation, thereby pushing the articles at right angles to the direction of the initial feed onto a staging area and eventually, as row after row is pushed onto the staging area, onto a downstream conveyor which feeds the rows to the next processing station. As the lead article is pushed onto the staging area and moves away from the whip, the whip switch shuts off the flow of air through the pilot actuator. The pilot actuator interrupts the flow of air to the lifting ram, which retracts to its initial position. The rocker arm, under the force of a biasing spring, swings back toward its engaged position, thereby allowing the tooth to ride along the circumferential edge of the timing wheel. The tooth engages in the next slot that is presented on the timing wheel as the shaft continues to rotate. This effectively raises the second end of the rocker arm high enough that it no longer depresses the master cylinder air switch. This shuts off the flow of air to the master cylinder, which removes the force from the piston required to turn the shaft. The spring-loaded piston and rod assembly in the master cylinder retracts thereupon into the master cylinder, drawing the ratchet arm back to its starting position. Thus, the shaft is locked into position after rotating a ¼-turn. In the Preferred Embodiment, the timing wheel has four slots on it and the push-rod assemblies have four push-rods, both arranged to correspond to four 90° angles of rotation. Thus, when the rocker arm tooth engages the timing wheel and air to the master cylinder is shut off, the shaft has rotated 90°. It is within the scope of the present invention, however, to use a timing sequence of other than 90°, i.e., a timing wheel with a different arrangement of slots and push-rod assemblies with corresponding arrangement of push-rods.

As the row of articles is being pushed onto the staging area, the next batch of articles is being pushed onto the transfer station by force of a continuing feed of upstream bottles. In the Preferred Embodiment, the feed from the upstream station controls the rate at which the transfer station works. Ideally, the transfer station forwards rows of articles to the downstream station at a speed that is slightly faster than the downstream station can process. This is advantageous when it is important for efficiency or other reasons to maintain continuous operation of the downstream station. The fact that rows of articles are being forwarded to the downstream station at a slightly faster speed than the downstream station can process the articles can lead to a back-up of rows at the transition between the staging area and the downstream conveyor. For this reason an optical sensor is mounted on the downstream conveyor to regulate the flow of articles. When the optical sensor, which in the Preferred Embodiment is a proximity switch, but can be any number of types of sensors, detects the presence of an article, it energizes a first relay which starts a timer. If a pre-set period of time lapses while the relay is still energized, this first relay energizes a second relay, which interrupts operations of the upstream station and upstream conveyor for a pre-set period of time. During this time, the downstream station continues to receive, process, and discharge rows of articles to a subsequent operation. When the pre-set period of time has expired, operation of the upstream station and conveyor resumes. In the Preferred Embodiment, upstream operations are halted when the sensor detects the presence of an article for more than 10 seconds; operations are resumed after an interruption period of approx. 30 seconds. These periods of time can, of course, be adjusted for the particular application.

The device of the present invention is not limited to the particular application of grouping bottles. The articles being grouped and transferred can include jars, cans, boxes, and, indeed, any type of container that is rigid enough to be pushed. In the Preferred Embodiment, a master cylinder with spring-loaded piston and rod assembly attached to a ratchet arm is used to turn the shaft. It shall be understood that it is within the scope of the present invention to apply means other than a master cylinder and ratchet arm to turn the shaft. A person skilled in the art of pneumatically-controlled mechanisms will be able to apply the techniques described herein and use other devices to turn the shaft, such as an air-driven gear motor, an air clutch, or other means that are well-known in the field.

In summary, the present invention is a device that groups and transfers articles from an upstream processing station to a downstream station. The articles are pushed onto a transfer station table and transferred as a row of articles to a second feed line that runs at right angles to the direction of the first feed line. The mechanism by which the row is transferred is a shaft with push-rod assemblies mounted on it that jut up through slots in the transfer station table and push the articles when the shaft is rotated. The transfer cycle is initiated by a lead article in a row of articles pushing against and deflecting a pneumatic whip switch. The whip switch actuates a pilot actuator, which sends air to a lifting ram that releases a rocker arm from a timing wheel; the rocker arm, in its released position, opens an air valve that sends air to a master cylinder. The pressurized master cylinder forces a ratchet arm to rotate the shaft. As the shaft rotates, the push-rods on the shaft push the articles out of the groove and onto a staging area, all the while new articles are being moved onto the transfer table. As the lead article is pushed toward the staging area, it loses contact with the whip switch. This interrupts the flow of air to the lifting ram, allowing the spring-biased rocker arm to swing upward toward its wheel-engaging position. As the rocker arm moves upward, the tooth rides along the circumferential edge of the timing wheel and snaps into the next slot present by the timing wheel as the shaft rotates, thereby releasing contact with the master cylinder air switch. The flow of air to the master cylinder is interrupted and the ratchet arm is drawn back to its initial inactive position. The use of pneumatic controls and the timing wheel has the advantage that the grouping and transfer device is very inexpensive, easy to maintain, and safe to use in a potentially wet environment. The device of the present invention also requires very little space in addition to the space required for the conveyors.

BRIEF DESCRIPTION OF THE DRAWINGS

FIG. 3 is a frontal view of the transfer shaft showing the connections to the ratchet arm and the timing wheel.

FIG. 3a is a schematic illustration of the end of the transfer shaft showing a sprocket, chain, and gear motor as the shaft drive means.

DETAILED DESCRIPTION OF THE PREFERRED EMBODIMENT

Figure 1:
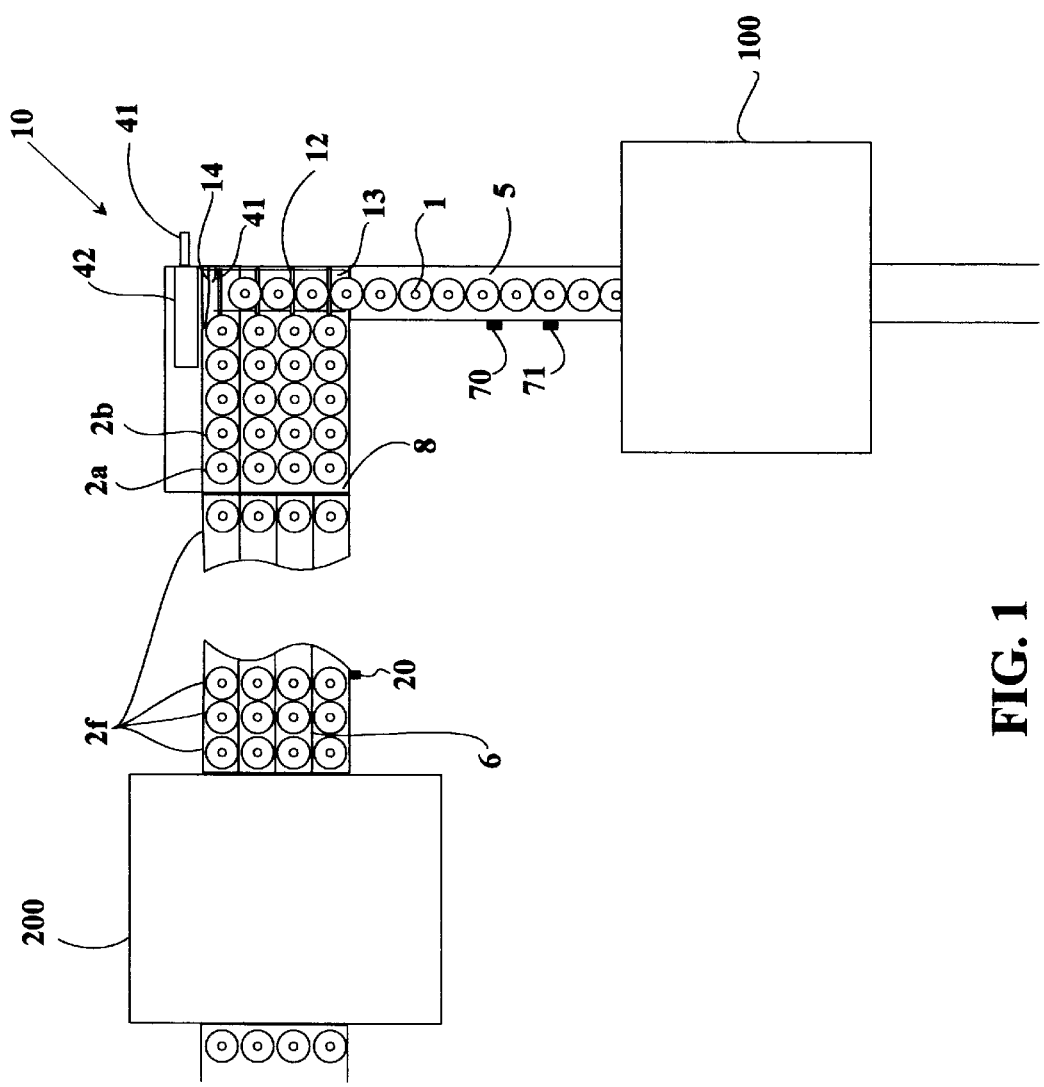
FIG. 1 is a top view of the Preferred Embodiment of the present invention, installed between two processing stations in a bottle-washing and -filling line.
Figure 2:
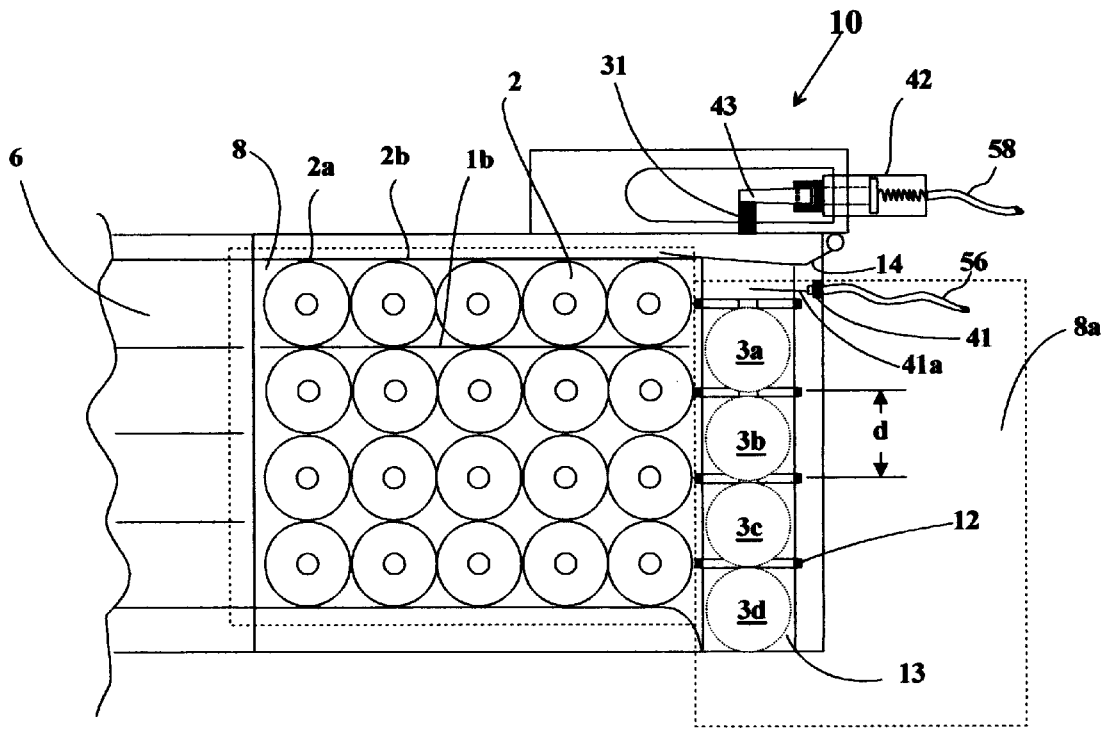
FIG. 2 is a top view of the transfer station table of the Preferred Embodiment of the present invention, showing the slots and guide groove.
Figure 2A:
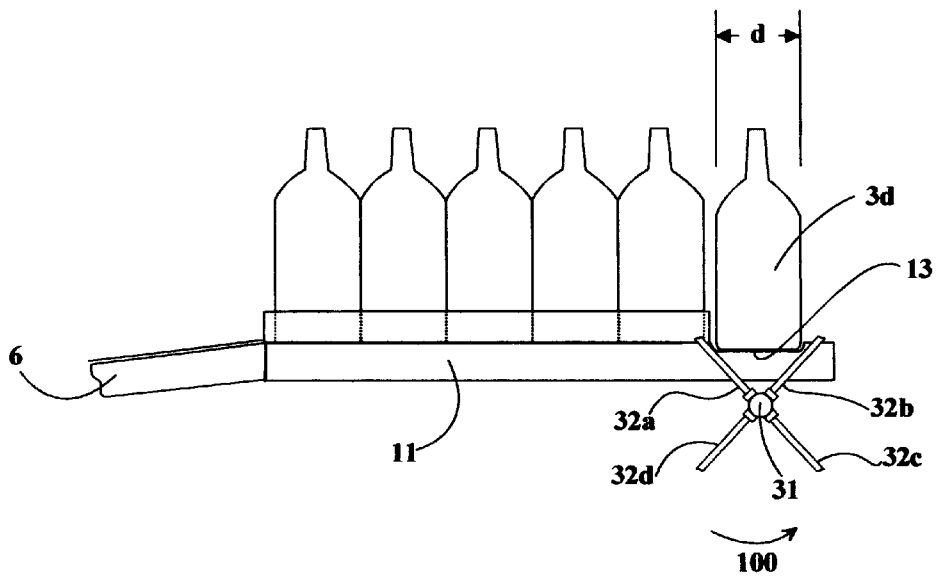
FIG. 2a is a side view of the transfer station table, showing the guide groove and the position of the push-rod assemblies between transfer cycles.

The Preferred Embodiment of the present invention is a bottle grouping and transfer station that is operated in a bottle-filling line using a Meheen Manufacturing brand filling station and/or other equipment that is commonly used in micro-breweries. In the Preferred Embodiment and as depicted in FIG. 1, the grouping and transfer station 10 receives a continuous single file feed of bottles 1, groups the bottles 1 to a row 2 of four bottles abreast as illustrated by the rows 2a 2b, . . . , 2f shown in FIG. 1, and transfers the row 2 at right angles to the direction of the initial bottle feed to a staging area 8 and eventually onto a downstream conveyor. The staging area 8, as well as a grouping area 8a are shown in FIG. 1 as areas enclosed in dashed lines. In the Preferred Embodiment and as shown in FIG. 2a, the downstream conveyor is an inclined-plane 6, that feeds the rows 2f to a downstream processing station 200. As also shown in FIG. 1, the bottles 1 are moved from a continuous-feed conveyor 5 onto the transfer station 10 by force of a constant flow of bottles 1 being discharged from an upstream processing station 100 or by another means not included within the scope of this invention. The bottles 1 leave the continuous-feed conveyor 5 and slide onto a transfer station table 11. This transfer station table 11, shown in FIG. 2, is preferably made of high-density polyethylene or some other material that will allow bottles 1 or other articles being processed to slide easily and with little friction across its surface. As can be seen in FIG. 2 and FIG. 2a, a shallow guide groove 13, having rounded inner corners corresponding approximately to a radiused transition between the bottom and the sides of the bottle 1 and in width to the diameter d of the bottom of the bottle 1, is cut or formed in the transfer station table 11 to facilitate the proper alignment of the bottles 1. With continued reference to FIG. 2, it can also be seen that slots 12 are cut into the table 11. Each slot 12 runs perpendicular to the direction of the upstream conveyor 5 and is located in the transfer station table 11 at locations that correspond to a center-to-center distance of the diameter d when a lead bottle 3a is pushed up against a lead-bottle guide rail 14. The length of the slot 12 is such that a bottle 1 can nestle in the guide groove 13 between a first transfer element 32a and a second transfer element 32b extending up through the slot 12 at positioned at each end of the slot 12, as shown in FIG. 2a. The transfer elements 32a and 32b will be discussed in more detail below. In the Preferred Embodiment, the slots are narrow, rectangular slots to accommodate cylindrical push-rods. The shape of the push-rods and slots can vary widely, though, depending on the geometry of the article being transferred, and a device having push-rods or pins of a different shape remains within the scope of the present invention.

Figure 4B:
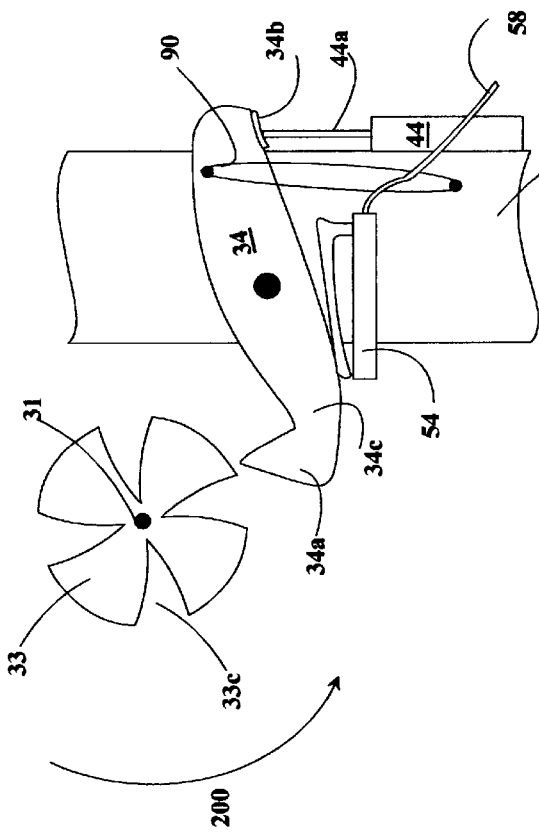
FIG. 4b is a side view of the timing wheel and the rocker arm in the disengaged position.
Figure 4A:
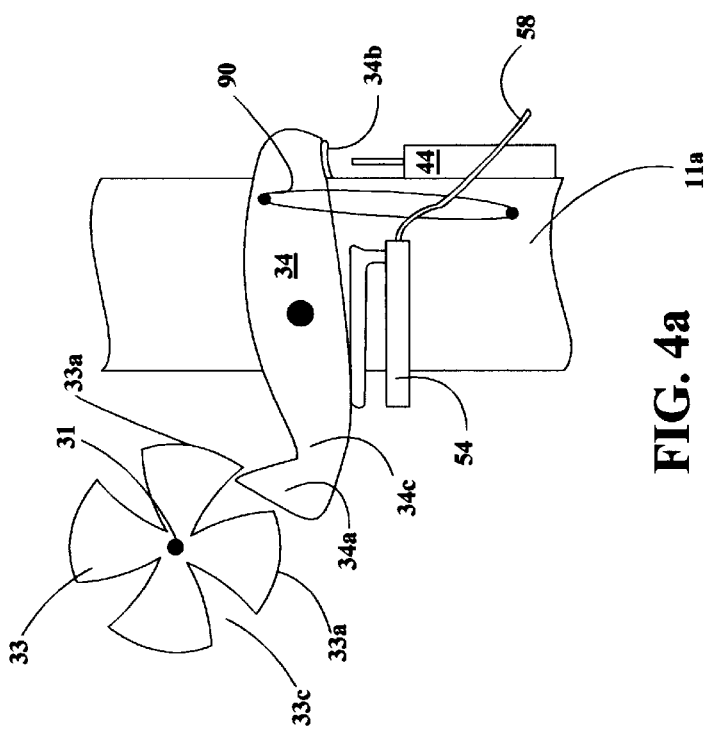
FIG. 4a is a side view of the timing wheel and the rocker arm in the engaged position.
Figure 5:
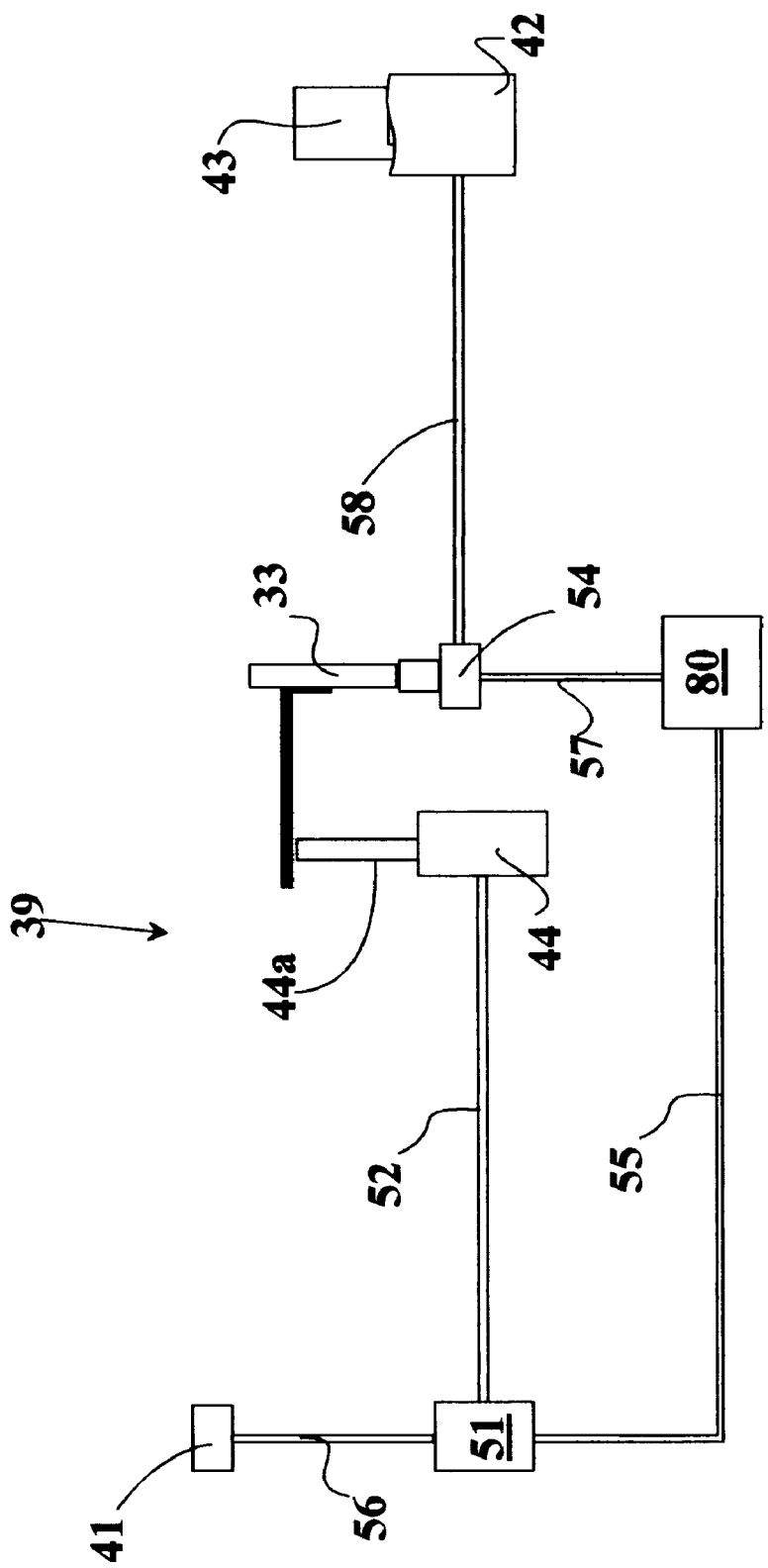
FIG. 5 is a schematic diagram of the pneumatic control system.

FIG. 3 shows the heart of the grouping and transfer station 10: a transfer shaft 31 mounted beneath the transfer table 11 and connected to a timing wheel 33 at one end and a ratchet arm 43 at the other end. Also shown in FIG. 3 and in FIG. 4a and FIG. 4b are a rocker arm 34 with a lifter plate 35 and a lifting ram 44. A schematic diagram of the pneumatic control system 39 is shown in FIG. 5. A pressurized air supply 80 supplies air to the control system 39 via air hoses 55 and 57. Referring now to FIGS. 2, 2a and FIG. 5, the lead bottle 3a and sequential bottles 3b, 3c, and 3d slide across the transfer station table 11 in the guide groove 13. Toward the end of travel, the lead bottle 3a deflects a whip 41a on the whip switch 41 that is connected to a pilot actuator 51 via a first air hose 56. When the whip switch 41a is deflected, air rushes through the switch 41, causing pressure in the pilot actuator 51 to drop, which opens a valve and allows air to flow through a second air hose 52 to a lifting ram 44. The bottles 3a, 3b, 3c, and 3d continue to move across the transfer station under force of the upstream supply of bottles. Referring now to FIGS. 4a and 4b, air in the lifting ram 44 forces a ram 44a to extend and lift a lifter plate 35 that is attached to the rocker arm 34 upward, thereby causing a first rocker arm end 34b to pivot upward and a second rocker arm end 34c downward, thereby disengaging a tooth 34a from the timing wheel 33. When the rocker arm 34 is disengaged from the timing wheel 33, the second rocker arm end 34c presses downward against a master cylinder switch 54 which sends air through a third air hose 58 shown in FIG. 5, to a master cylinder 42. A piston and rod assembly 42a (not shown) in the master cylinder 42 is forced outward by the air, pushing the ratchet arm 43 that is connected to the piston and rod assembly 42a to an extended position and thereby rotating the transfer shaft 31 as indicated by shaft rotation arrow 200 in FIG. 4b. In the Preferred Embodiment, the master cylinder 42 and ratchet arm 43 are used to turn the shaft 31; other means for turning the shaft 31, such as an air-driven gear motor, can also be used and are discussed below.

Referring now to FIGS. 2a and 3, it can be seen that the transfer shaft 31 has a set of four push-rod assemblies 32 mounted along it. In the Preferred Embodiment, a push-rod assembly 32 includes four push-rods 32a, 32b,32c, and 32d which are arranged around the shaft 31 at 90° intervals. FIG. 2a shows the position of the push-rod assembly 32 on the shaft 31 when the timing wheel 33 is engaged by the rocker arm 34. Push-rods 32a and 32b extend up through slot 12, one at each end of the slot 12. When the transfer shaft 31 is rotated, as described above, the push-rod 32b rotates with the shaft 31 and, as the tip of the push-rod 32b follows an arcuate path through slot 12 to the position of push-rod 32a, pushes the respective bottle 3a, 3b, 3c, or 3d onto the staging area 8.

In the Preferred Embodiment, the whip switch 41 shuts off as soon as the lead bottle 3a is pushed far enough forward that it no longer deflects the whip 41a. This leads to an increase in pressure in the pilot actuator 51, causing the actuator 51 to shut off the flow of air to the lifting ram 44. The ram 44a retracts to its inactive position, allowing the spring-biased rocker arm 34 to move into its wheel-engaging position and the lifter plate 35 to drop back toward its inactive position. The tooth 34a may ride along an outer circumferential edge 33a of the timing wheel 33 until it can snap into a slot 33c presented by the rotating timing wheel 33. As the tooth 34a snaps into the slot 33c, the second rocker arm 34c loses contact with the master cylinder air switch 54, which now closes, interrupting the flow of air to the master cylinder 42. The master cylinder 42 vents air to the atmosphere and the piston and rod assembly 42a, which, in the Preferred Embodiment is spring-loaded, retracts back into the master cylinder 42 when it is no longer pressurized by the air supply, drawing the ratchet arm 43 back to its starting position. Thus, in the Preferred Embodiment, the transfer shaft 31 rotates a ¼-turn in one transfer cycle and pushes a row 2 of four bottles 3a, 3b, 3c, and 3d onto a staging area 8, at a substantially right angle to the longitudinal direction of the continuous-feed conveyor 5.

In an alternative embodiment as illustrated in FIG. 3a, the master cylinder 42, the piston and rod assembly 42a and the ratchet arm 43 are replaced by an air-powered gear motor 61 which is attached to the end of the transfer shaft 31 by an endless chain 62 and sprockets 63. The system of pneumatic controls 39, including the whip switch 41, the pilot actuator 51, the switch 54, and the air hoses 52 and 55–58, remains unchanged. A person skilled in the art will be able to apply the method and device of the present invention to other types of drive mechanisms to drive the shaft 31, such as an air clutch that is actuated by the master cylinder switch 54 and takes power from an external source to drive the shaft 31, or other drive means, and such applications are within the scope of the present invention.

Referring again to FIG. 2, the staging area 8 is just wide enough to contain the row 2 of four bottles 3a, 3b, 3c, and 3d. The lead bottle 3a deflects the whip 41a on the whip switch 41, initiating the transfer cycle. As the transfer shaft 31 is pushing a row 2 onto the staging area 8, the upstream feed of bottles 1 is not interrupted; rather, new bottles 1 are continuously being moved forward and onto the table 11. As a result, the row of bottles 2 being pushed from the guide groove 13 onto the staging area 8 is also still being pushed in the direction of the initial feed. This forces the lead bottle 3a up against the lead-article guide rail 14, which is an elongated metal bar extending into the staging area 8 and curves back toward a far end of the staging area 8. The lead-article guide rail 14 is also spring-loaded and can deflect slightly under the force applied by the lead bottle 3a. As the lead bottle 3a is pushed up against the lead-article guide rail 14, the rail 14 guides the lead bottle 3a onto a track on the staging area 8 defined by the lead-article guide rail 14 and a lead-bottle guide rod 16 mounted in the surface of the staging area 8. The lead-article guide rail 14 serves to stabilize the bottles 3a, 3b, 3c, and 3d as they are pushed up over the edge of the groove 13 and onto the staging area 8 by the push-rods while simultaneously being pushed in the direction of the initial feed by the continuing feed of upstream bottles 1. During the transfer cycle, a second row 2b of four bottles is moving into place in the guide groove 13. This second row 2b subsequently displaces the initial row 2a on the staging area 8, forcing the initial row 2a farther along the staging area 8 toward a downstream processing station 200.

In the Preferred Embodiment, an inclined-plane 6 is used to move the rows 2a, 2b, . . . toward the downstream station 200, although it is within the scope of the present invention to have a downstream conveyor that is a horizontal conveyor and moves the rows by a means other than the force of gravity. FIG. 1 shows the staging area 8 full of rows 2a, 2b, . . . The next row 2 to be transferred to the staging area 8 will force row 2a onto the inclined-plane 6. The bottles 1 in row 2a will be forced into separate tracks between guide rods 62 mounted in the inclined-plane 6 and begin to slide down the inclined-plane 6, to be stopped by rows 2f waiting in front of the next downstream processing station 200. In this manner, a continuous feed of rows 2f of four bottles 1 is provided to the downstream processing station 200. It may be advantageous to maintain several rows 2f of bottles on this inclined-plane 6. For example, in the Preferred Embodiment the downstream station 200 is a bottle-filling machine which should be run without interruption for reasons of cost efficiency, the filling operation being timewise the lengthiest operation in the line. The presence of several rows on the inclined plane 6 also reduces the distance that subsequent rows 2f travel before they are stopped, thus reducing the likelihood that bottles 1 can topple during travel. In the Preferred Embodiment, the continuous feed of rows 2f of bottles 1 to the downstream processing station 200 is ensured by running the upstream station 100 so as to deliver slightly more bottles 1 than the downstream station 200 can process in the same amount of time. The operating speed of the transfer station 10 is determined in large part by the speed of delivery of bottles 1 and will, thus, deliver rows 2 faster than the downstream station 200 can process. Consequently, rows 2f will eventually back up on the inclined-plane 6. This back-up would normally lead to a bottle jam at the transfer station 10. Shown in FIG. 1 is a sensor 20 mounted on the inclined-plane 6. In the Preferred Embodiment, the sensor 20 is an optical proximity switch that detects the presence of a bottle in front of the switch; other types of sensors can also be used. The sensor 20 is wired to a first relay 70 on the upstream station 100. When the sensor 20 detects the presence of a bottle 1, it energizes the first relay 70, which starts a timer. If the relay 20 remains energized for a period greater than a first pre-set time period, a second relay 71 will interrupt power for a period of time to the upstream station 100 and to the continuous-feed conveyor 5. The use of various types of control devices with timers is well-known in the field and, thus, is not described in detail herein. During the time upstream operations are interrupted, the downstream processing station 200 will continue to receive, process and discharge rows of bottles 2f, thereby clearing the back-up and providing space for new rows 2f to move onto the inclined-plane 6. In the Preferred Embodiment, the second relay 71 interrupts power if the first relay 1 remains energized for greater than 10 seconds at one time; upstream operations are interrupted for a period of 30 seconds and then automatically resumed. These time periods are variable and will depend on the particular application.

While a Preferred Embodiment is disclosed herein, this is not intended to be limiting. Rather, the general principles set forth herein are considered to be merely illustrative of the scope of the present invention and it is to be further understood that numerous changes may be made without straying from the scope of the present invention.

I claim:

1. An apparatus for grouping and transferring articles, said apparatus comprising:

an upstream conveyor having a discharge end, wherein said upstream conveyor feeds a supply of articles in an initial feed direction;

a transfer station having a substantially horizontal transfer surface that includes a grouping area and a staging area, wherein said transfer station is placed at said discharge end of said upstream conveyor and is adapted to receive a first row of articles from said upstream conveyor onto said grouping area, said articles being in a first orientation;

a transfer cycle control system having at least one sensor on said transfer station that senses when a complete row of articles is present on said grouping area; and a transfer assembly that includes a transfer shaft, and a plurality of push-rod assemblies arranged along said transfer shaft, wherein said transfer assembly is mounted on said transfer station and adapted to slidably transfer said first row of articles from said grouping area onto said staging area in a direction that is substantially perpendicular to said initial feed direction, wherein each one of said push-rod assemblies is provided with a push-rod array having a plurality of push-rods, each push-rod having a push-rod tip, wherein said push-rod tip of one of said push-rods of said push-rod array on each one of said push-rod assemblies comes into contact with a respective one article of said complete row of articles so as to slidably move said respective one article onto said staging area during a partial rotation of said shaft, and wherein said articles maintain said first orientation when slidably transferred.

2. The apparatus as claimed in claim 1, wherein said articles are open at an upper end for filling and said first orientation is an upright position.

3. Method of grouping a subset of said articles to a row, and transferring said row to a downstream processing station, using the apparatus as claimed in claim 1, said method comprising the steps of:

a) receiving a subset of articles pushed by a feed source onto a transfer station table;

b) grouping said subset into a row by constraining a movement of said subset across said transfer station table within confines presented by a guide groove and a rail guide;

c) triggering a pneumatic control system by a lead article of said row;

d) pneumatically triggering a transfer rotation cycle by pivoting a rocker arm to disengage from a timing wheel on a transfer shaft, said rocker arm thereby actuating an air valve which pressurizes a master cylinder to force a ratchet arm to swing about and rotate said transfer shaft;

e) transferring said row of articles by pushing said row from said guide groove onto a staging area at substantially right angles to an initial direction of said feed; and f) interrupting said transfer rotation cycle after said lead article has been pushed onto said staging area.

4. Method as claimed in claim 3 further comprising a process flow control including the steps of:

a) sensing a presence of said articles in front of said downstream processing station;

b) triggering a first control device to time said presence;

c) when a duration of said presence is greater than a pre-set period of time, triggering a second control device to interrupt upstream operations;

d) allowing said downstream station to continue processing said rows;

e) resuming said upstream operations after a second pre-set period of time has lapsed.

5. The apparatus as claimed in claim 1, wherein said transfer station has a first side and a second side, and said grouping area includes a grouping means that includes a guide groove in a top surface of said grouping area, wherein said guide groove extends in said initial feed direction from said first side toward said second side of said transfer station, and wherein a plurality of transfer slots is provided in said guide groove, each one of said grooves extending perpendicular to a longitudinal axis of said guide groove and arranged in said guide groove so that each one of said slots is approximately centered beneath a respective one of said articles when said first row articles has been grouped and wherein said push-rod tip of each respective push-rod assembly extends up through and traces an arcuate path across said guide groove during said partial rotation of said transfer shaft.

6. The apparatus as claimed in claim 5, wherein said first row of articles has a lead article that is an article closest to said second side, wherein said guide rail is mounted on said second side of said transfer station and positioned substantially perpendicular to and athwart said guide groove and over a first portion of said staging area, and wherein said guide rail is spring-loaded so as to deflect back toward said second side when said lead article impinges on said guide rail.

7. The apparatus as claimed in claim 6 further comprising a transfer cycle control system having at least one sensor on said transfer station that senses when a complete row of articles is present in said grouping area.

8. The apparatus as claimed in claim 7 further comprising a transfer shaft drive means connected to said transfer shaft, and a pneumatic control system that controls said transfer shaft drive means, wherein said at least one sensor is a first air switch and said pneumatic control system includes a pressurized air supply, a pilot actuator, a timing wheel, a rocker arm, a lifting ram, a first supply line, a second air supply line, and a third air supply line, said first air switch, a second air switch, and a lifter;

wherein said pneumatic control apparatus is connected by said first supply line with said pilot actuator that is connected with said first air switch that is triggerable by said lead article in said first row of articles, and with said second second air switch that is controllable by said rocker arm, wherein said lifter is attached to said rocker arm and extends outward from it, said rocker arm further having a first rocker arm end, a second rocker arm end, and a stop tooth on said second rocker arm end, wherein said pneumatic control apparatus is connected by said second supply line with said lifting ram, wherein said first air switch, upon being triggered, draws air via said first supply line from said pilot actuator, thereby causing a drop in air pressure in said pilot actuator, said drop then causing air to flow via said second air hose to said lifting ram, forcing said lifting ram to extend upward and to raise said lifter on said rocker arm, thereby allowing said first rocker arm end to pivot upward and said second rocker arm end to pivot downward so as to disengage said stop tooth on said second rocker arm end from said timing wheel, said second rocker arm simultaneously triggering said second air switch, causing said second air switch to send air via said third air hose to said transfer shaft drive means.

9. The apparatus as claimed in claim 8, said shaft drive means comprising a master cylinder with a piston and rod assembly movably attached to a first end of a ratchet arm, a second end of said ratchet arm being fixedly attached to a second end of said transfer shaft, wherein said piston and rod assembly in said master cylinder is pressurized by air from said second air switch, forcing said piston and rod assembly to extend from said master cylinder thereby causing said ratchet arm to swing about said shaft.

10. The device as claimed in claim 9, wherein said shaft drive means is an air-driven gear motor, said gear motor driving said transfer shaft by a sprocket and chain device.

11. The device as claimed in claim 8, wherein said first air switch is a whip switch.

12. The apparatus as claimed in claim 11, further comprising a downstream conveyor and a process flow controller that includes a process flow sensor, a first control device, and a second control device, wherein said process flow sensor is placed in a location on a downstream conveyor so as to be able to sense a presence of an article on said downstream conveyor as said article passes in front of said process flow sensor, said first control device triggerable by said process flow sensor when said process flow sensor senses said presence of said article, and said second control device triggerable by said first control device when said process flow sensor has sensed said presence for a first pre-set period of time without interruption, said second control device thereupon interrupting power to upstream operations for a second pre-set period of time.

13. The apparatus as claimed in claim 12, wherein said process flow sensor is an optical sensor, said first control device is a first relay with timer, and said second control device is a second relay with timer.

14. The apparatus as claimed in claim 12, wherein said downstream conveyor has a negative incline relative to said horizontal surface of said transfer.

15. The device as claimed in claim 8, wherein said timing wheel is fixedly attached to said transfer shaft to rotate with said transfer shaft, said timing wheel being a disk with a plurality of evenly spaced curved slots cut into said disk, said slots spaced to correspond to a desired degree of rotation of said transfer shaft and shaped to accommodate said tooth on said rocker arm, so that, as said timing wheel rotates, said tooth can snap into one of said slots.

16. The device as claimed in claim 15, wherein said rocker arm is spring-loaded at a first rocker-arm end so as to bias said second rocker-arm end to move upward against said timing wheel, when said said lifting ram is in an unpresssurized state.

17. The device as claimed in claim 15, wherein said timing wheel and said rocker arm are made of rigid, durable material.

18. The device of claim 15, wherein said plurality of slots has four slots.

19. A apparatus for receiving a feed of bottles from an upstream location in an initial feed direction, forming a subset of said bottles into a group, and transferring said group toward a downstream location, said device comprising a transfer table, a transfer shaft, a pneumatic control system, a drive system for said transfer shaft, and a process flow controller, wherein a transfer is directed substantially perpendicular to an initial feed direction;

wherein said transfer station includes a table, said table having a grouping means and four transfer slots, said grouping means including a guide groove in a top surface of said table and a guide rail, said guide groove extending parallel to a longitudinal direction of a continuous-feed conveyor from a first table side to a second table side and said lead-bottle guide rail being mounted on said second table side;

wherein each transfer slot is a slot through said table, extending athwart and beyond a width of said guide groove;

wherein said transfer shaft is mounted beneath said table, wherein four push-rod assemblies are fixedly mounted on said transfer shaft, each one of said four rush-rod assemblies having an array of four push-rods spaced 90° apart on said shaft, each push-rod having a push-rod tip, so as to allow one said push-rod tip on each of said four push-rod assemblies to extend up through and trace an arcuate path across a respective on of said transfer slots as said transfer shaft rotates;

wherein said pneumatic control system includes a pressurized air supply, a whip switch triggerable by a lead article in said subset of articles in said guide groove, said whip switch being connected via a first air hose to a pilot actuator, said pilot actuator triggerable by said whip switch and connected to said pressurized air supply via a first supply hose and to a lifting ram via a second air hose, and an air switch connected via a second supply hose to said pressurized air supply and via a third air hose to a transfer shaft drive means, said air switch triggerable by a second arm of a rocker arm;

wherein said shaft drive means comprises a master cylinder with a piston and rod assembly swingably attached to a first end of a ratchet arm, a second end of said ratchet arm ratchetably attached to a second end of said transfer shaft so as to drive said transfer shaft in a forward direction only when said piston and rod assembly is pressurized, said piston and rod assembly being pressurized by air from said air switch; and wherein said process flow controller comprises an optical proximity sensor, a first relay, and a second relay, said optical proximity sensor being located so as to sense a presence of a bottle in front of said optical proximity sensor and, when sensing said presence, to energize said first relay, said first relay counting a first pre-set period of time and said sensor de-energizing said first relay when said presence is no longer detected, and wherein said first relay energizes said second relay if said first pre-set period of time lapses, said second relay interrupting upstream operations for a second pre-set period of time, said upstream operations resuming automatically after said second pre-set period of time has lapsed.

20. Device as claimed in claim 19, wherein said group of bottles is fed to a Meheen Manufacturing brand filling station at said downstream location.

\* \* \* \* \*